(12) United States Patent
Zhang et al.

(10) Patent No.: US 11,822,188 B2
(45) Date of Patent: Nov. 21, 2023

(54) PIXEL ELECTRODE AND LIQUID CRYSTAL DISPLAY PANEL

(71) Applicant: Shenzhen China Star Optoelectronics Semiconductor Display Technology Co., Ltd., Guangdong (CN)

(72) Inventors: Qi Zhang, Guangdong (CN); Yoonsung Um, Guangdong (CN); Wu Cao, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 660 days.

(21) Appl. No.: 16/963,253

(22) PCT Filed: Apr. 29, 2020

(86) PCT No.: PCT/CN2020/087695
§ 371 (c)(1),
(2) Date: Jul. 20, 2020

(87) PCT Pub. No.: WO2021/196329
PCT Pub. Date: Oct. 7, 2021

(65) Prior Publication Data
US 2023/0091176 A1   Mar. 23, 2023

(30) Foreign Application Priority Data
Apr. 1, 2020   (CN) .......................... 202010251122.3

(51) Int. Cl.
*G02F 1/1343*   (2006.01)
*G02F 1/1337*   (2006.01)

(52) U.S. Cl.
CPC .. *G02F 1/134309* (2013.01); *G02F 1/133707* (2013.01); *G02F 2201/123* (2013.01)

(58) Field of Classification Search
CPC .................... G02F 1/133707; G02F 1/134345
See application file for complete search history.

(56) References Cited

U.S. PATENT DOCUMENTS

2008/0225218 A1 * 9/2008 Lee .................. G02F 1/134336
349/144
2015/0070644 A1 * 3/2015 Lee .................. G02F 1/134363
349/142

(Continued)

FOREIGN PATENT DOCUMENTS

| CN | 1909236 | 2/2007 |
| CN | 101546073 | 9/2009 |

(Continued)

OTHER PUBLICATIONS

CN109491152 translation (Year: 2018).*

*Primary Examiner* — James A Dudek

(57) ABSTRACT

The present invention provides a pixel electrode and a liquid crystal display panel. A first side electrode and a second side electrode are respectively connected to both ends of a first trunk electrode, and a third side electrode and a fourth side electrode are respectively disposed on sides of the first side electrode and the second side electrode away from a branch electrode. Each of the first side electrode and the second side electrode is provided with a notch at a junction with the first trunk electrode, and the two notches are respectively disposed on the sides of the first side electrode and the second side electrode away from the branch electrode, which can relieve dark lines at pixel boundaries.

20 Claims, 4 Drawing Sheets

(56) References Cited

U.S. PATENT DOCUMENTS

| | | | |
|---|---|---|---|
| 2017/0322468 A1* | 11/2017 | Kim | ................ G02F 1/134309 |
| 2018/0004049 A1 | 1/2018 | Jung et al. | |
| 2018/0088409 A1 | 3/2018 | Lee et al. | |
| 2018/0129110 A1* | 5/2018 | Syn | ................ G02F 1/136286 |
| 2019/0041705 A1 | 2/2019 | Hao | |
| 2019/0384124 A1 | 12/2019 | Ye | |
| 2020/0301216 A1 | 9/2020 | Lee et al. | |

FOREIGN PATENT DOCUMENTS

| | | |
|---|---|---|
| CN | 102466935 | 5/2012 |
| CN | 103792738 | 5/2014 |
| CN | 104570517 | 4/2015 |
| CN | 107272272 | 10/2017 |
| CN | 107329334 | 11/2017 |
| CN | 107340655 | 11/2017 |
| CN | 107608146 | 1/2018 |
| CN | 109491152 | 3/2019 |
| CN | 110007533 | 7/2019 |
| CN | 110908195 | 3/2020 |
| CN | 107870470 | 8/2021 |
| JP | 2011197112 | 10/2011 |

\* cited by examiner

"PIXEL ELECTRODE AND LIQUID CRYSTAL DISPLAY PANEL"

RELATED APPLICATIONS

This application is a National Phase of PCT Patent Application No. PCT/CN2020/087695 having International filing date of Apr. 29, 2020, which claims the benefit of priority of Chinese Application No. 202010251122.3 filed on Apr. 1, 2020. The contents of the above applications are all incorporated by reference as if fully set forth herein in their entirety.

FIELD AND BACKGROUND OF THE INVENTION

The present invention relates to the field of display technologies, and in particular, to a pixel electrode and a liquid crystal display panel.

Multi-domain vertical alignment (MVA) liquid crystal displays have been widely used in large-sized liquid crystal displays due to their advantages of high contrast and wide viewing angles. With evolution of screen sizes to large screens, designs of pixel electrodes with eight domains are being paid attention to in large size displays with their excellent viewing angle performance. However, during alignment processes of the pixel electrodes with the eight domains, for liquid crystal molecules disposed at pixel boundaries, driving forces from side electrodes of trunk electrodes and sub-pixel electrodes simultaneously exist at the pixel boundaries, making an effect of controlling orientation of the liquid crystal molecules thereof poor. When an alignment force in one direction is greater than an alignment force in another opposite direction, it will cause some of the liquid crystal molecules at that location to tilt in the opposite direction, wherein an actual tilting direction is opposite to an ideal direction, resulting in dark lines and loss of light transmittance.

In summary, there is a need to provide a new pixel electrode and liquid crystal display panel to solve the above technical problems.

A pixel electrode and a liquid crystal display panel provided by the present invention solve technical problem that a tilt direction of current pixel electrodes is opposite to an ideal direction when some liquid crystal molecules at pixel boundaries are aligned, resulting technical problems of dark lines and loss of light transmittance.

SUMMARY OF THE INVENTION

In order to solve the above problems, technical solutions provided by the present invention are as follows:

An embodiment of the present invention provides a pixel electrode, comprising:

a trunk electrode, comprising a first trunk electrode and a second trunk electrode disposed in a cross shape;

a branch electrode connected to the trunk electrode, wherein an angle between the branch electrode and the trunk electrode is 45°, and a side electrode, comprising a first side electrode, a second side electrode, a third side electrode, and a fourth side electrode, wherein the first side electrode and the second side electrode are respectively connected to both ends of the first trunk electrode, and the third side electrode and the fourth side electrode are respectively disposed on sides of the first side electrode and the second side electrode away from the branch electrode;

wherein each of the first side electrode and the second side electrode is provided with a notch at a junction with the first trunk electrode, and the two notches are respectively disposed on the sides of the first side electrode and the second side electrode away from the branch electrode.

According to the pixel electrode provided by an embodiment of the present invention, each of the third side electrode and the fourth side electrode is provided with a protrusion corresponding to a position of one of the notches, and the two protrusions are respectively disposed on sides of the third side electrode and the fourth side electrode close to the branch electrode.

According to the pixel electrode provided by an embodiment of the present invention, an axis of the protrusion, an axis of the notch, and an axis of an extension direction of the first trunk electrode are collinear.

According to the pixel electrode provided by an embodiment of the present invention, a shape of the protrusion corresponds to a shape of the notch.

According to the pixel electrode provided by an embodiment of the present invention, further comprises a plurality of slits spaced apart from the branch electrode and disposed parallel to each other, wherein a side of the notch is parallel to an extension direction of the slits.

According to the pixel electrode provided by an embodiment of the present invention, a shape of the notch is triangular or trapezoidal.

According to the pixel electrode provided by an embodiment of the present invention, further comprises a main pixel electrode and a sub-pixel electrode;

wherein the main pixel electrode comprises the first trunk electrode, the second trunk electrode, the first side electrode, and the second side electrode;

the sub-pixel electrode comprises a third trunk electrode disposed parallel to the first trunk electrode, a fourth trunk electrode crossing the third trunk electrode to form a cross shape, the third side electrode, and the fourth side electrode, the third side electrode and the fourth side electrode are respectively connected to both ends of the third trunk electrode and extend in a direction in which the sub-pixel electrode points to the main pixel electrode, each of the third side electrode and the fourth side electrode is provided with a gap with one of the first side electrode and the second side electrode, and the gap communicates with one of the notches.

According to the pixel electrode provided by an embodiment of the present invention, a width of the gap decreases along a direction from two ends of each of the first side electrode and the second side electrode close to the first trunk electrode.

According to the pixel electrode provided by an embodiment of the present invention, further comprises a control component disposed on a side of the main pixel electrode away from the sub-pixel electrode, wherein the control component is electrically connected to the main pixel electrode and the sub-pixel electrode.

An embodiment of the present invention provides a pixel electrode, comprising:

a trunk electrode, comprising a first trunk electrode and a second trunk electrode disposed in a cross shape;

a branch electrode connected to the trunk electrode, wherein an angle is between the branch electrode and the trunk electrode; and a side electrode, comprising a first side electrode, a second side electrode, a third side electrode, and a fourth side electrode, wherein the first side electrode and the second side electrode are respectively connected to both ends of the first trunk electrode, and the third side electrode and the fourth side electrode are respectively disposed on sides of the first side electrode and the second side electrode away from the branch electrode;

wherein each of the first side electrode and the second side electrode is provided with a notch at a junction with the first trunk electrode, and the two notches are respectively disposed on the sides of the first side electrode and the second side electrode away from the branch electrode.

According to the pixel electrode provided by an embodiment of the present invention, each of the third side electrode and the fourth side electrode is provided with a protrusion corresponding to a position of one of the notches, and the two protrusions are respectively disposed on sides of the third side electrode and the fourth side electrode close to the branch electrode.

According to the pixel electrode provided by an embodiment of the present invention, an axis of the protrusion, an axis of the notch, and an axis of an extension direction of the first trunk electrode are collinear.

According to the pixel electrode provided by an embodiment of the present invention, a shape of the protrusion corresponds to a shape of the notch.

According to the pixel electrode provided by an embodiment of the present invention, a height of the protrusion in the extension direction of the first trunk electrode is greater than or equal to 1 um.

According to the pixel electrode provided by an embodiment of the present invention, further comprises a plurality of slits spaced apart from the branch electrode and disposed parallel to each other, wherein a side of the notch is parallel to an extension direction of the slits.

According to the pixel electrode provided by an embodiment of the present invention, a shape of the notch is triangular or trapezoidal.

According to the pixel electrode provided by an embodiment of the present invention, further comprises a main pixel electrode and a sub-pixel electrode;

wherein the main pixel electrode comprises the first trunk electrode, the second trunk electrode, the first side electrode, and the second side electrode;

the sub-pixel electrode comprises a third trunk electrode disposed parallel to the first trunk electrode, a fourth trunk electrode crossing the third trunk electrode to form a cross shape, the third side electrode, and the fourth side electrode, the third side electrode and the fourth side electrode are respectively connected to both ends of the third trunk electrode and extend in a direction in which the sub-pixel electrode points to the main pixel electrode, each of the third side electrode and the fourth side electrode is provided with a gap with one of the first side electrode and the second side electrode, and the gap communicates with one of the notches.

According to the pixel electrode provided by an embodiment of the present invention, a width of the gap decreases along a direction from two ends of each of the first side electrode and the second side electrode close to the first trunk electrode.

According to the pixel electrode provided by an embodiment of the present invention, further comprises a control component disposed on a side of the main pixel electrode away from the sub-pixel electrode, wherein the control component is electrically connected to the main pixel electrode and the sub-pixel electrode.

An embodiment of the present invention provides a liquid crystal display panel comprising the above pixel electrode.

Beneficial effects of the present invention are: A pixel electrode and a liquid crystal display panel provided by the present invention, by disposing a notch at each of a first side electrode and a second side electrode at a junction with a first trunk electrode, when liquid crystal molecules are disposed at pixel boundaries relative to an upper side and a lower side of the first trunk electrode for liquid crystal alignment, they can maintain opposite alignment directions without interference from each other, so as to achieve an ideal tilt direction, which can effectively relieve dark lines of the pixel boundaries and improve light transmittance.

BRIEF DESCRIPTION OF THE SEVERAL VIEWS OF THE DRAWINGS

In order to more clearly illustrate the embodiments or the technical solutions in the prior art, a brief introduction of the drawings used in the embodiments or the prior art description will be briefly described below. Obviously, the drawings in the following description are only some of the embodiments of the invention, and those skilled in the art can obtain other drawings according to the drawings without any creative work.

DESCRIPTION OF SPECIFIC EMBODIMENTS OF THE INVENTION

Figure 1:
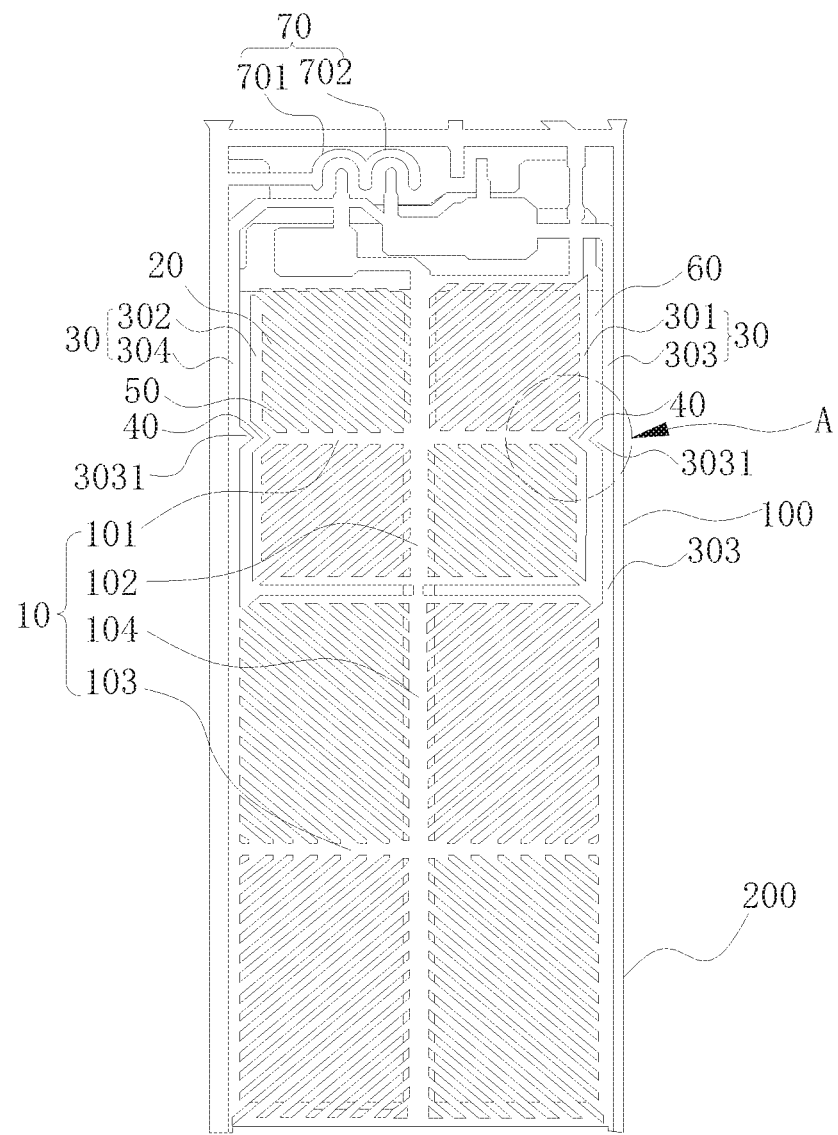
FIG. 1 is a schematic plan structural view of a pixel electrode according to an embodiment of the present invention.

The following description of the various embodiments is provided with reference to the accompanying drawings. Directional terms, such as upper, lower, front, back, left, right, inner, outer, and lateral side, mentioned in the present invention are only for reference. Therefore, the directional terms are used for describing and understanding rather than limiting the present invention. In the figures, units having similar structures are used for the same reference numbers.

In the description of the present invention, it is to be understood that the terms "center," "longitudinal," "lateral," "length," "width," "thickness," "upper," "lower," "front," "rear," "left," "right," "vertical," "horizontal," "top," "bottom," "inner," "outer," "clockwise," "counterclockwise," and the like are used in the orientations and positional relationships indicated in the drawings for convenience in describing the present invention and for simplicity in description, and are not intended to indicate or imply that the referenced devices or elements must have a particular orientation, be constructed in a particular orientation, and be operated in a particular manner, and are not to be construed as limiting the present invention. Furthermore, the terms "first" and "second" are used for descriptive purposes only and are not to be construed as indicating or implying relative importance or implicitly indicating the number of technical features indicated. Thus, features defined as "first", "second", may explicitly or implicitly include one or more of the described features. In the description of the present application, "plurality" means two or more unless specifically limited otherwise.

In the description of the present invention, it is to be noted that, unless otherwise explicitly specified or limited, the terms "mounted," "connected," and "linked" are to be construed broadly, e.g., as meaning either a fixed connection, a removable connection, or an integral connection; may be mechanically connected, may be electrically connected or may be in communication with each other; either directly or indirectly through intervening media, either internally or in any other relationship. The specific meaning of the above terms in the present invention can be understood by those of ordinary skill in the art as appropriate.

In the present invention, unless otherwise specifically defined and defined, the first feature is "on" or "under" the second feature may include that the first feature is in direct contact to the second feature, and may also include that the first feature and the second feature are not in direct contact but through additional features between them. Moreover, the first feature is "on," "above," and "under" the second feature includes the first feature is directly above and obliquely above the second feature, or merely indicating that the high of the first feature is higher than the second feature. The first feature is "below," "under," and "lower" the second feature includes the first feature is directly below and obliquely below the second feature, or merely indicating that the high of the first feature is less than the second feature.

The following disclosure provides many different embodiments or examples for implementing different features of the invention. In order to simplify the disclosure of the present invention, specific example components and arrangements are described below. Of course, they are merely examples and are not intended to limit the present invention. Moreover, the present invention may repeat reference numerals and/or letters in the various examples, such repetition is for the purpose of simplicity and clarity and does not in itself dictate a relationship between the various embodiments and/or configurations discussed. In addition, examples of various specific processes and materials are provided herein, but one of ordinary skill in the art may recognize applications of other processes and/or uses of other materials.

A pixel electrode and a liquid crystal display panel in the prior art have a defect in which a portion of liquid crystal molecules disposed at pixel boundary is tilted in a direction opposite to an ideal direction, resulting in dark lines and loss of light transmittance. Embodiments of the present invention can solve the defect.

Figure 2:
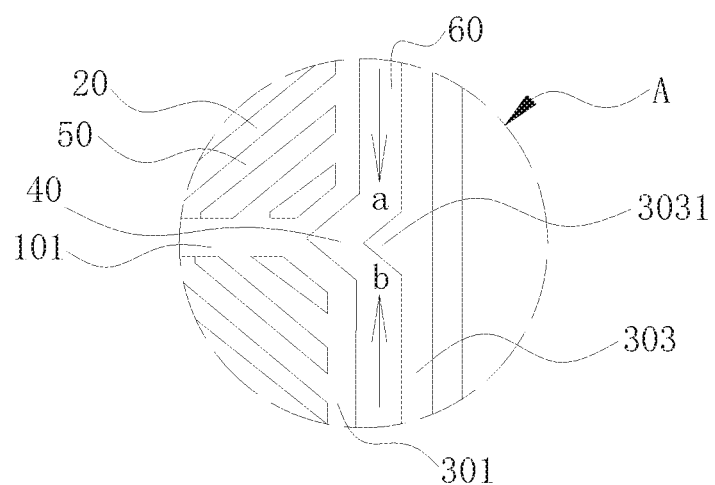
FIG. 2 is an enlarged schematic view of an area A in FIG. 1.

Referring to FIG. 1 and FIG. 2, a pixel electrode provided by an embodiment of the present invention comprises a trunk electrode 10, a branch electrode 20, and a side electrode 30. The trunk electrode 10 comprises a first trunk electrode 101 and a second trunk electrode 102 arranged in a cross shape. The branch electrode 20 is connected to the trunk electrode 10. An angle is formed between the branch electrode 20 and the trunk electrode 10. The angle between the branch electrode 20 and the first trunk electrode 101 may be 30° to 60°, preferably, the angle between the branch electrode 20 and the first trunk electrode 101 is 45°.

The side electrode 30 comprises a first side electrode 301, a second side electrode 302, a third side electrode 303, and a fourth side electrode 304. The first side electrode 301 and the second side electrode 302 are respectively connected to both ends of the first trunk electrode 101, and the third side electrode 303 and the fourth side electrode 304 are respectively disposed on sides of the first side electrode 301 and the second side electrode 302 away from the branch electrode 20. It can be understood that a junction of the first trunk electrode 101 with the first side electrode 301 and the second side electrode 302 is a pixel boundary of the pixel electrode, and a portion of liquid crystal molecules disposed at the pixel boundary are subjected to an opposite driving force when they are aligned.

In an embodiment of the present invention, each of the first side electrode 301 and the second side electrode 302 is provided with a notch 40 at the junction with the first trunk electrode 101, and the two notches 40 are respectively disposed on the sides of the first side electrode 301 and the second side electrode 302 away from the branch electrode 20, so that the liquid crystal molecules having two different alignment directions at the pixel boundary do not interfere with each other, so as to control a tilting direction of the liquid crystal molecules well and prevent the liquid crystal molecules from tilting in a direction opposite to an ideal tilting direction, thereby eliminating dark shadows and improving light transmittance.

Specifically, the pixel electrode further comprises a plurality of slits 50 spaced apart from the branch electrode 20 and disposed parallel to each other, wherein a side of the notch 40 is parallel to an extension direction of the slits 50, so that a tilting direction of the liquid crystal molecules in the notch 40 is consistent with a tilting direction of liquid crystal molecules in the slits 50 in an adjacent alignment region, and the notch 40 can act as the slit 50. After the liquid crystal molecules at the pixel boundary are tilted, the liquid crystal molecules inside the pixel will be driven down, thereby eliminating dark lines and improving the light transmittance.

Optionally, a shape of the notch 40 is triangular or trapezoidal. Preferably, the shape of the notch 40 is triangular.

Further, each of the third side electrode 303 and the fourth side electrode 304 is provided with a protrusion 3031 corresponding to a position of one of the notches 40, and the two protrusions 3031 are respectively disposed on sides of the third side electrode 303 and the fourth side electrode 304 close to the branch electrode 20. An arrangement of the protrusion 3031 can further block mutual interference between the liquid crystal molecules with two different alignment directions at the pixel boundary. For example, the liquid crystal molecules on an upper side of the first trunk electrode 101 at the pixel boundary are tilted along a direction a, the liquid crystal molecules on a lower side of the first trunk electrode 101 are tilted along a direction b, and the direction a and the direction b are two opposite directions.

Preferably, a shape of the protrusion 3031 corresponds to the shape of the notch 40, for example, both are triangular. A side of the protrusion 3031 is parallel to the side of the notch 40 to better control an orientation of the liquid crystal molecules between the notch 40 and the protrusion 3031.

Preferably, an axis of the protrusion 3031, an axis of the notch 40, and an axis of an extension direction of the first trunk electrode 101 are collinear. The shapes of the protrusion 3031 and the notch 40 are symmetrical figures to maintain symmetry of the pixel electrode.

It should be noted that the pixel electrode adopts a multi-domain pixel electrode design, such as a four-domain pixel electrode or an eight-domain pixel electrode. When the pixel electrode adopts the four-domain pixel electrode, the third side electrode 303 and the fourth side electrode 304 may be traces of the pixel electrode different from the first side electrode 301 and the second side electrode 302. Preferably, in the embodiment of the present invention, the pixel electrode may adopt the eight-domain pixel electrode design, which may be applied to a large-sized liquid crystal display device.

Specifically, the pixel electrode comprises a main pixel electrode 100 and a sub-pixel electrode 200, and the sub-pixel electrode 200 surrounds the main pixel electrode 100. For example, the sub-pixel electrode 200 partially surrounds the main pixel electrode 100, preferably the sub-pixel electrode 200 surrounds half of the main pixel electrode 100. In an embodiment of the present invention, the third side electrode 303 and the fourth side electrode 304 are part of the sub-pixel electrode 200, and the third side electrode 303 and the fourth side electrode 304 extend in a direction in which the sub-pixel electrode 200 points to the main pixel electrode 100.

The main pixel electrode 100 comprises the first trunk electrode 101, the second trunk electrode 102, the first side electrode 301, and the second side electrode 302. The first trunk electrode 101 and the second trunk electrode 102 divide the main pixel electrode 100 into four alignment regions in different directions. The sub-pixel electrode 200 comprises a third trunk electrode 103 disposed parallel to the first trunk electrode 101, a fourth trunk electrode 104 crossing the third trunk electrode 103 to form a cross shape, the third side electrode 303, and the fourth side electrode 304. The third trunk electrode 103 and the fourth trunk electrode 104 divide the sub-pixel electrode 200 into four alignment regions in different directions. The third side electrode 303 and the fourth side electrode 304 are respectively connected to both ends of the third trunk electrode 103 and extend in a direction in which the sub-pixel electrode points to the main pixel electrode 100. Compared with general pixel electrodes, this type of pixel electrode can save traces of common electrode lines and data line BM less (DBS) electrode lines, which can significantly increase an aperture ratio.

Each of the third side electrode 303 and the fourth side electrode 304 is provided with a gap 60 with one of the first side electrode 301 and the second side electrode 302, and the gap 60 communicates with one of the notches 40. The notch 40 can block an interference of the driving force received by the liquid crystal molecules in different alignment directions in the gap, thereby eliminating the dark lines and improving the light transmittance.

Figure 3:
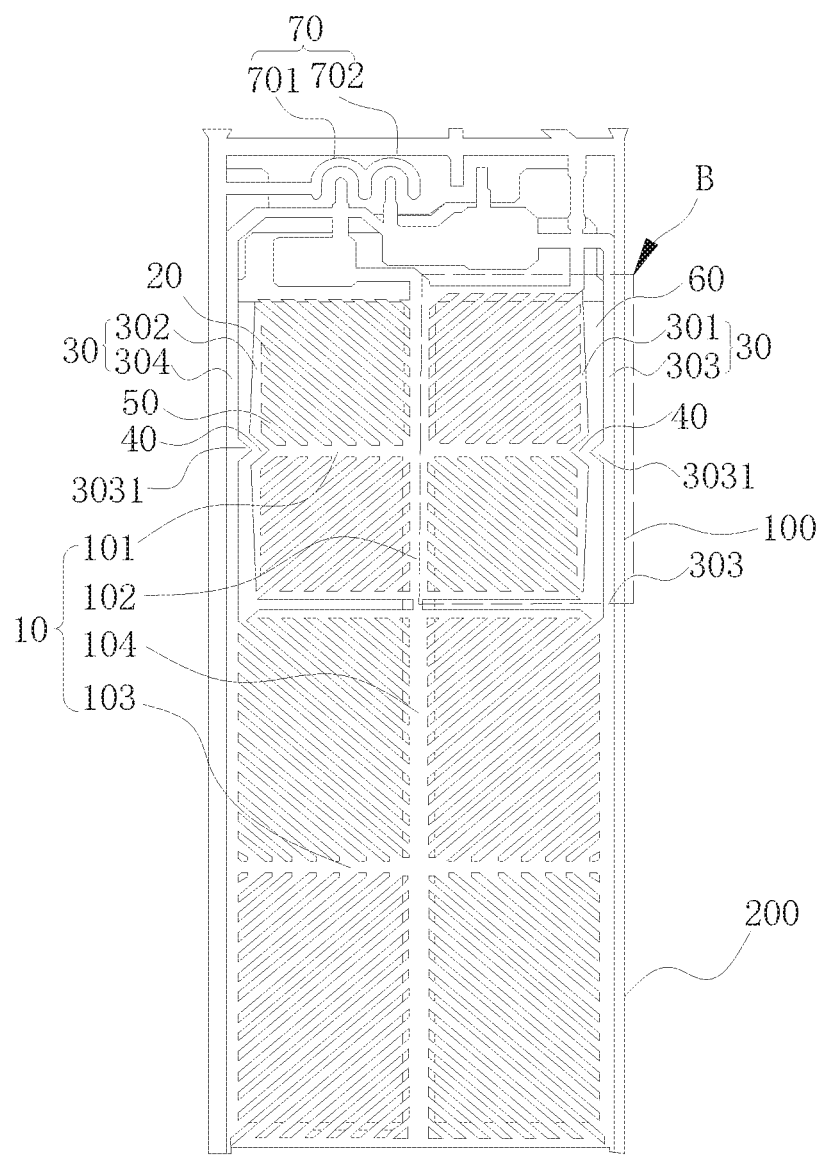
FIG. 3 is a schematic plan structural view of another pixel electrode provided by an embodiment of the present invention.
Figure 4:
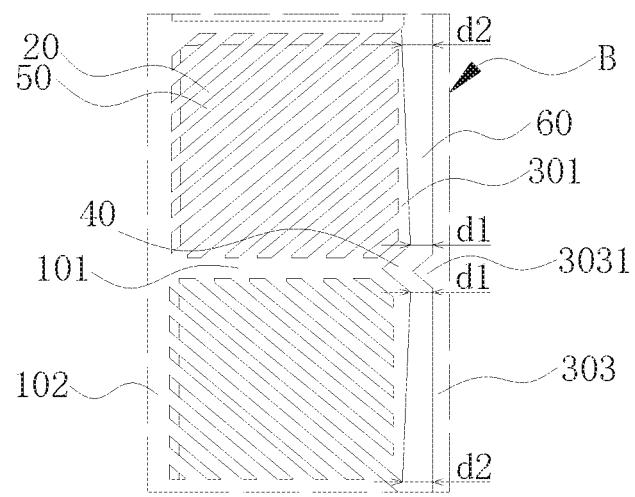
FIG. 4 is an enlarged schematic view of an area B in FIG. 3.

Further, as shown in FIG. 3 and FIG. 4, a width of the gap 60 decreases along a direction from two ends of each of the first side electrode 301 and the second side electrode 302 close to the first trunk electrode 101. Therefore, the liquid crystal molecules can be restrained from tilting in a same direction, and an effect of orientation control of the liquid crystal molecules can be improved, which is conducive to the convergence of the dark lines. For example, a width d1 of the gap 60 close to the first trunk electrode 101 is less than a width d2 of the gap 60 at both ends of the first side electrode.

Specifically, it may be implemented in such a manner that the widths of the first side electrode 301 and the second side electrode 302 increase from the two ends of the first side electrode 301 to a direction close to the first trunk electrode 101. It can also be achieved by increasing the widths of the third side electrode 303 and the fourth side electrode 304 from the two ends to the direction close to the first trunk electrode 101. The embodiments of the present invention are not limited thereto.

Specifically, a height of the protrusion 3031 in the extension direction of the first trunk electrode 101 is greater than or equal to 1 um, but not greater than the width of the gap corresponding to the protrusion 3031.

The pixel electrode further comprises a control component 70. The control component 70 may comprise a first switching element 701, a second switching element 702, and signal traces, etc. The control component 70 is disposed on a side of the main pixel electrode 100 away from the sub-pixel electrode 200, and the control component 70 is electrically connected to the main pixel electrode 100 and the sub-pixel electrode 200 respectively to provide control signals. For example, the first switching element 701 is electrically connected to the main pixel electrode 100, and the second switching element 702 is electrically connected to the sub-pixel electrode 200.

An embodiment of the present invention further provides a liquid crystal display panel comprising the above pixel electrode. The liquid crystal display panel may have a technical effect achieved by the pixel electrode, which will not be repeated here.

The beneficial effects are: The pixel electrode and the liquid crystal display panel provided by the embodiment of the present invention, by disposing the notch at each of the first side electrode and the second side electrode at the junction with the first trunk electrode, when the liquid crystal molecules disposed at the pixel boundary relative to the upper side and the lower side of the first trunk electrode for liquid crystal alignment, they can maintain opposite alignment directions without interference from each other, so as to achieve an ideal tilt direction, which can effectively relieve the dark lines of the pixel boundary and improve light transmittance.

In summary, although the present invention has been disclosed as above with preferred embodiments, the above preferred embodiments are not intended to limit the present invention. Those of ordinary skill in the art can make various changes and modifications without departing from the spirit and scope of the present invention. Therefore, the protection scope of the present invention is subject to the scope defined by the claims.

What is claimed is:

1. A pixel electrode, comprising:
   a trunk electrode, comprising a first trunk electrode and a second trunk electrode disposed in a cross shape;
   a branch electrode connected to the trunk electrode, wherein an angle between the branch electrode and the trunk electrode is 45°, and
   a side electrode, comprising a first side electrode, a second side electrode, a third side electrode, and a fourth side electrode, wherein the first side electrode and the second side electrode are respectively connected to both ends of the first trunk electrode, and the third side electrode and the fourth side electrode are respectively disposed on sides of the first side electrode and the second side electrode away from the branch electrode;
   wherein each of the first side electrode and the second side electrode is provided with a notch at a junction with the first trunk electrode, and the two notches are respectively disposed on the sides of the first side electrode and the second side electrode away from the branch electrode;
   wherein the pixel electrode further comprises a main pixel electrode and a sub-pixel electrode; wherein the main pixel electrode comprises the first trunk electrode, the second trunk electrode, the first side electrode, and the second side electrode; and wherein the sub-pixel electrode comprises a third trunk electrode disposed parallel to the first trunk electrode, a fourth trunk electrode crossing the third trunk electrode to form a cross shape, the third side electrode, and the fourth side electrode, the third side electrode and the fourth side electrode are respectively connected to both ends of the third trunk electrode and extend in a direction in which the sub-pixel electrode points to the main pixel electrode; and wherein each of the third side electrode and the fourth side electrode is provided with a gap with one of the first side electrode and the second side electrode, and the gap communicates with one of the notches; and wherein a width of the gap decreases along a direction from two ends of each of the first side electrode and the second side electrode close to the first trunk electrode.

2. The pixel electrode as claimed in claim 1, wherein each of the third side electrode and the fourth side electrode is provided with a protrusion corresponding to a position of one of the notches, and the two protrusions are respectively disposed on sides of the third side electrode and the fourth side electrode close to the branch electrode.

3. The pixel electrode as claimed in claim 2, wherein an axis of the protrusion, an axis of the notch, and an axis of an extension direction of the first trunk electrode are collinear.

4. The pixel electrode as claimed in claim 2, wherein a shape of the protrusion corresponds to a shape of the notch.

5. The pixel electrode as claimed in claim 1, further comprising a plurality of slits spaced apart from the branch electrode and disposed parallel to each other, wherein a side of the notch is parallel to an extension direction of the slits.

6. The pixel electrode as claimed in claim 5, wherein a shape of the notch is triangular or trapezoidal.

7. The pixel electrode as claimed in claim 1, further comprising a control component disposed on a side of the main pixel electrode away from the sub-pixel electrode, wherein the control component is electrically connected to the main pixel electrode and the sub-pixel electrode.

8. A pixel electrode, comprising:
a trunk electrode, comprising a first trunk electrode and a second trunk electrode disposed in a cross shape;
a branch electrode connected to the trunk electrode, wherein an angle is between the branch electrode and the trunk electrode; and
a side electrode, comprising a first side electrode, a second side electrode, a third side electrode, and a fourth side electrode, wherein the first side electrode and the second side electrode are respectively connected to both ends of the first trunk electrode, and the third side electrode and the fourth side electrode are respectively disposed on sides of the first side electrode and the second side electrode away from the branch electrode;
wherein each of the first side electrode and the second side electrode is provided with a notch at a junction with the first trunk electrode, and the two notches are respectively disposed on the sides of the first side electrode and the second side electrode away from the branch electrode;
wherein the pixel electrode further comprises a main pixel electrode and a sub-pixel electrode; wherein the main pixel electrode comprises the first trunk electrode, the second trunk electrode, the first side electrode, and the second side electrode; and wherein the sub-pixel electrode comprises a third trunk electrode disposed parallel to the first trunk electrode, a fourth trunk electrode crossing the third trunk electrode to form a cross shape, the third side electrode, and the fourth side electrode, the third side electrode and the fourth side electrode are respectively connected to both ends of the third trunk electrode and extend in a direction in which the sub-pixel electrode points to the main pixel electrode; and wherein each of the third side electrode and the fourth side electrode is provided with a gap with one of the first side electrode and the second side electrode, and the gap communicates with one of the notches; and wherein a width of the gap decreases along a direction from two ends of each of the first side electrode and the second side electrode close to the first trunk electrode.

9. The pixel electrode as claimed in claim 8, wherein each of the third side electrode and the fourth side electrode is provided with a protrusion corresponding to a position of one of the notches, and the two protrusions are respectively disposed on sides of the third side electrode and the fourth side electrode close to the branch electrode.

10. The pixel electrode as claimed in claim 9, wherein an axis of the protrusion, an axis of the notch, and an axis of an extension direction of the first trunk electrode are collinear.

11. The pixel electrode as claimed in claim 9, wherein a shape of the protrusion corresponds to a shape of the notch.

12. The pixel electrode as claimed in claim 9, wherein a height of the protrusion in the extension direction of the first trunk electrode is greater than or equal to 1 um.

13. The pixel electrode as claimed in claim 8, further comprising a plurality of slits spaced apart from the branch electrode and disposed parallel to each other, wherein a side of the notch is parallel to an extension direction of the slits.

14. The pixel electrode as claimed in claim 13, wherein a shape of the notch is triangular or trapezoidal.

15. The pixel electrode as claimed in claim 8, further comprising a control component disposed on a side of the main pixel electrode away from the sub-pixel electrode, wherein the control component is electrically connected to the main pixel electrode and the sub-pixel electrode.

16. A liquid crystal display panel comprising a pixel electrode, wherein the pixel electrode comprises:
a trunk electrode, comprising a first trunk electrode and a second trunk electrode disposed in a cross shape;
a branch electrode connected to the trunk electrode, wherein an angle is between the branch electrode and the trunk electrode; and
a side electrode, comprising a first side electrode, a second side electrode, a third side electrode, and a fourth side electrode, wherein the first side electrode and the second side electrode are respectively connected to both ends of the first trunk electrode, and the third side electrode and the fourth side electrode are respectively disposed on sides of the first side electrode and the second side electrode away from the branch electrode;
wherein each of the first side electrode and the second side electrode is provided with a notch at a junction with the first trunk electrode, and the two notches are respectively disposed on the sides of the first side electrode and the second side electrode away from the branch electrode;
wherein the pixel electrode further comprises a main pixel electrode and a sub-pixel electrode; wherein the main pixel electrode comprises the first trunk electrode, the second trunk electrode, the first side electrode, and the second side electrode; and wherein the sub-pixel electrode comprises a third trunk electrode disposed parallel to the first trunk electrode, a fourth trunk electrode crossing the third trunk electrode to form a cross shape, the third side electrode, and the fourth side electrode, the third side electrode and the fourth side electrode are respectively connected to both ends of the third trunk electrode and extend in a direction in which the sub-pixel electrode points to the main pixel electrode; and wherein each of the third side electrode and the fourth side electrode is provided with a gap with one of the first side electrode and the second side electrode, and the gap communicates with one of the notches; and wherein a width of the gap decreases along a direction from two ends of each of the first side electrode and the second side electrode close to the first trunk electrode.

17. The pixel electrode as claimed in claim 8, wherein along the direction from two ends of each of the first side electrode and the second side electrode close to the first trunk electrode, both of a width of the third side electrode and a width of the fourth side electrode are constant, and both of a width of the first side electrode and a width of the second side electrode increase.

18. The pixel electrode as claimed in claim 8, wherein along the direction from two ends of each of the first side electrode and the second side electrode close to the first trunk electrode, both of a width of the first side electrode and a width of the second side electrode are constant, and both of a width of the third side electrode and a width of the fourth side electrode increase.

19. The pixel electrode as claimed in claim 8, wherein each of the third side electrode and the fourth side electrode is provided with a protrusion close to the first trunk electrode; and wherein two protrusions extend into the gaps, respectively, and the two protrusions and the gaps are spaced apart, respectively.

20. The pixel electrode as claimed in claim 16, wherein each of the third side electrode and the fourth side electrode is provided with a protrusion close to the first trunk electrode; and wherein two protrusions extend into the gaps, respectively, and the two protrusions and the gaps are spaced apart, respectively.

* * * * *